(12) United States Patent
Salamanca Poblete et al.

(10) Patent No.: US 12,138,633 B2
(45) Date of Patent: Nov. 12, 2024

(54) SYSTEM AND METHOD FOR CHANGING LINERS, THE CONFIGURATION OF WHICH ALLOWS THE AUTOMATED REMOVAL AND INSERTION OF LINERS OF A MILL USED FOR ORE GRINDING

(71) Applicant: MI ROBOTIC SOLUTIONS S.A. [CL/CL], Santiago (CL)

(72) Inventors: Hugo Salamanca Poblete, Santiago (CL); Luis Baeza Ramirez, Santiago (CL)

(73) Assignee: MI ROBOTIC SOLUTIONS S.A. (CL)

( * ) Notice: Subject to any disclaimer, the term of this patent is extended or adjusted under 35 U.S.C. 154(b) by 181 days.

(21) Appl. No.: 17/418,819

(22) PCT Filed: Dec. 27, 2018

(86) PCT No.: PCT/CL2018/050150
§ 371 (c)(1),
(2) Date: Jun. 27, 2021

(87) PCT Pub. No.: WO2020/132756
PCT Pub. Date: Jul. 2, 2020

(65) Prior Publication Data
US 2022/0062915 A1 Mar. 3, 2022

(51) Int. Cl.
*B02C 17/22* (2006.01)
*B02C 17/18* (2006.01)
(Continued)

(52) U.S. Cl.
CPC .............. *B02C 17/18* (2013.01); *B02C 17/22* (2013.01); *B23P 19/02* (2013.01); *B25J 5/02* (2013.01);
(Continued)

(58) Field of Classification Search
CPC ......... B02C 17/18; B02C 17/22; B23P 19/02; B23P 6/00; B23P 19/04; B25J 5/02;
(Continued)

(56) References Cited

U.S. PATENT DOCUMENTS 8,083,457 B2 * 12/2011 Allen .................... B66C 23/201
414/688
8,930,019 B2 * 1/2015 Allen .................... G06F 1/1632
700/250

(Continued)

FOREIGN PATENT DOCUMENTS

CN 203484901 3/2014
CN 105643655 8/2016
(Continued)

*Primary Examiner* — Lawrence Averick
(74) *Attorney, Agent, or Firm* — Gottlieb, Rackman & Reisman, P.C.

(57) ABSTRACT

The invention relates to a system and method for changing liners of a mill, the configuration of which allows the automated robotic manipulation of liners of mills for ore grinding in comminution processes. The configuration and operation of the system allows the task of manipulation to be improved, having a greater degree of freedom and/or flexibility in its movements, thereby providing a greater degree of certainty and efficiency to the method and thus optimising the time that the mill is halted for maintenance, and also preventing the risks to which maintenance staff may be exposed. The system comprises at least one support structure, at least one system for supplying and moving liners, at least one robotic manipulator system for manipulating the liners, at least one liner manipulation tool, at least one artificial vision system, and at least one control system.

16 Claims, 22 Drawing Sheets

(51) Int. Cl.
*B23P 19/02* (2006.01)
*B25J 5/02* (2006.01)
*B25J 9/06* (2006.01)
*B25J 19/04* (2006.01)

(52) U.S. Cl.
CPC ............... B25J 9/06 (2013.01); B25J 19/04 (2013.01); *G05B 2219/39* (2013.01); *G05B 2219/40* (2013.01)

(58) Field of Classification Search
CPC ... B25J 9/06; B25J 19/04; B25J 19/023; B25J 9/0009; B25J 11/00; G05B 2219/40071; G05B 2219/45058; G05B 2219/45094
See application file for complete search history.

(56) References Cited

U.S. PATENT DOCUMENTS

| | | | | |
|---|---|---|---|---|
| 9,207,657 | B2* | 12/2015 | Hormann | G05B 19/409 |
| 9,607,239 | B2* | 3/2017 | Bridges | H04N 13/239 |
| 9,628,775 | B2* | 4/2017 | Bridges | G01B 5/012 |
| 9,927,800 | B2* | 3/2018 | Hormann | G05B 15/02 |
| 10,457,344 | B2* | 10/2019 | Sadri | B62D 65/06 |
| 2006/0283000 | A1* | 12/2006 | Allen | B66C 23/201 |
| | | | | 29/700 |
| 2012/0173018 | A1* | 7/2012 | Allen | G05D 1/0248 |
| | | | | 700/245 |
| 2014/0094945 | A1* | 4/2014 | Hormann | B25J 9/16 |
| | | | | 700/83 |
| 2015/0130906 | A1* | 5/2015 | Bridges | G06T 7/13 |
| | | | | 348/46 |
| 2015/0229907 | A1* | 8/2015 | Bridges | G01B 11/2513 |
| | | | | 348/46 |
| 2016/0085234 | A1* | 3/2016 | Hormann | B23Q 37/00 |
| | | | | 700/179 |
| 2018/0178867 | A1* | 6/2018 | Sadri | B23P 19/04 |
| 2022/0315033 | A1* | 10/2022 | Park | G06V 10/143 |
| 2022/0324070 | A1* | 10/2022 | Elias Cabrera | B25J 15/0253 |

FOREIGN PATENT DOCUMENTS

| | | |
|---|---|---|
| EP | 2199719 | 6/2010 |
| WO | 2015010163 | 1/2015 |
| WO | 2015172262 | 11/2015 |
| WO | 2017029435 | 2/2017 |

* cited by examiner

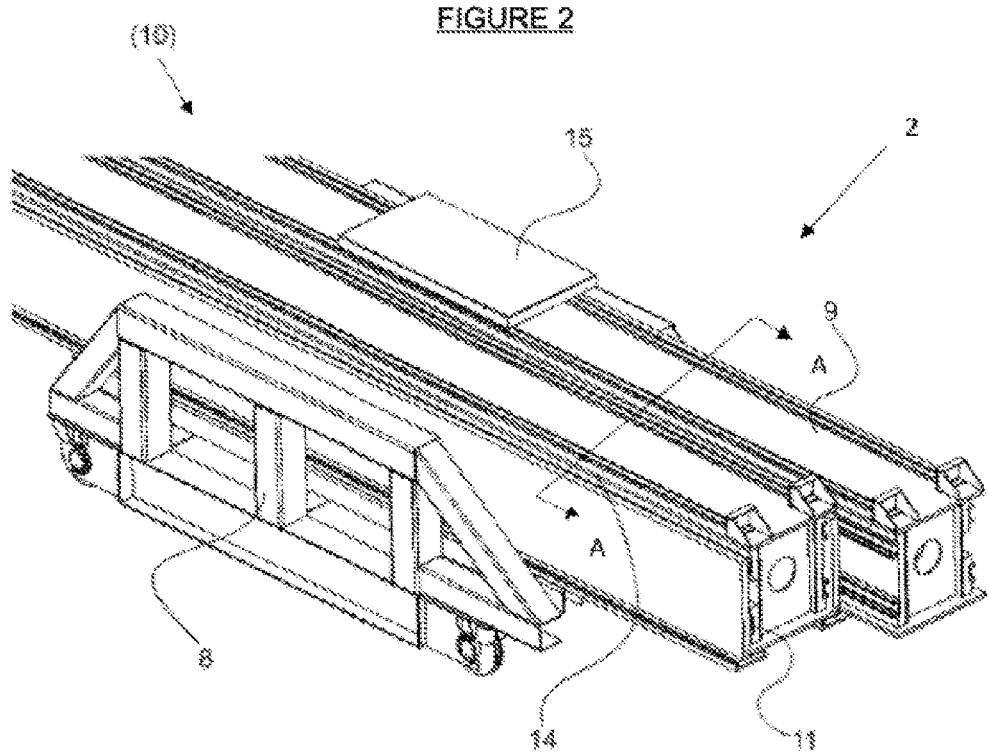

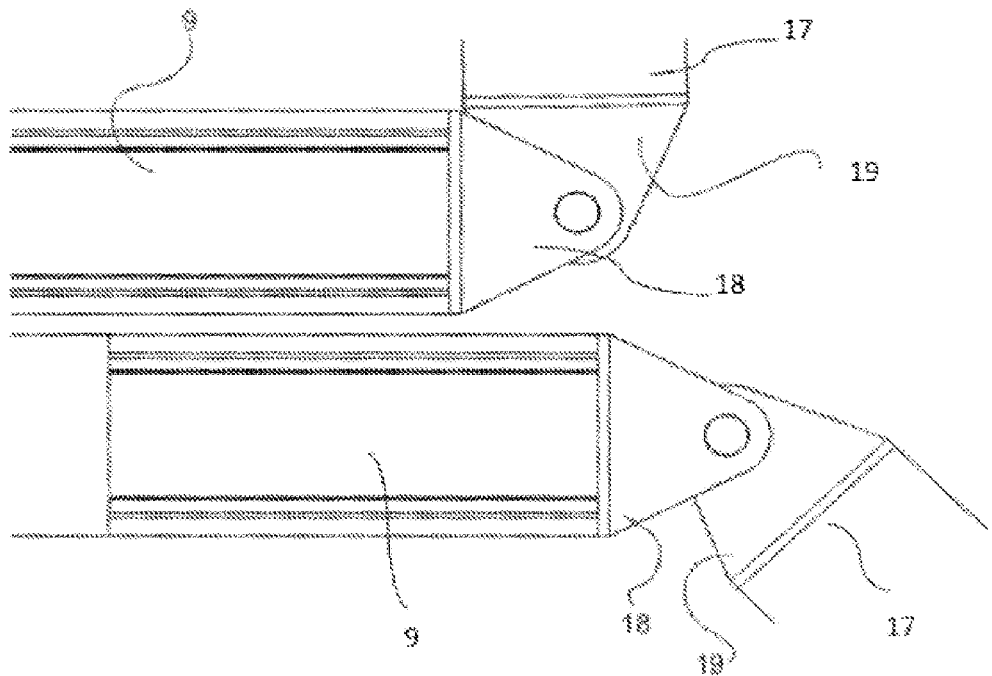

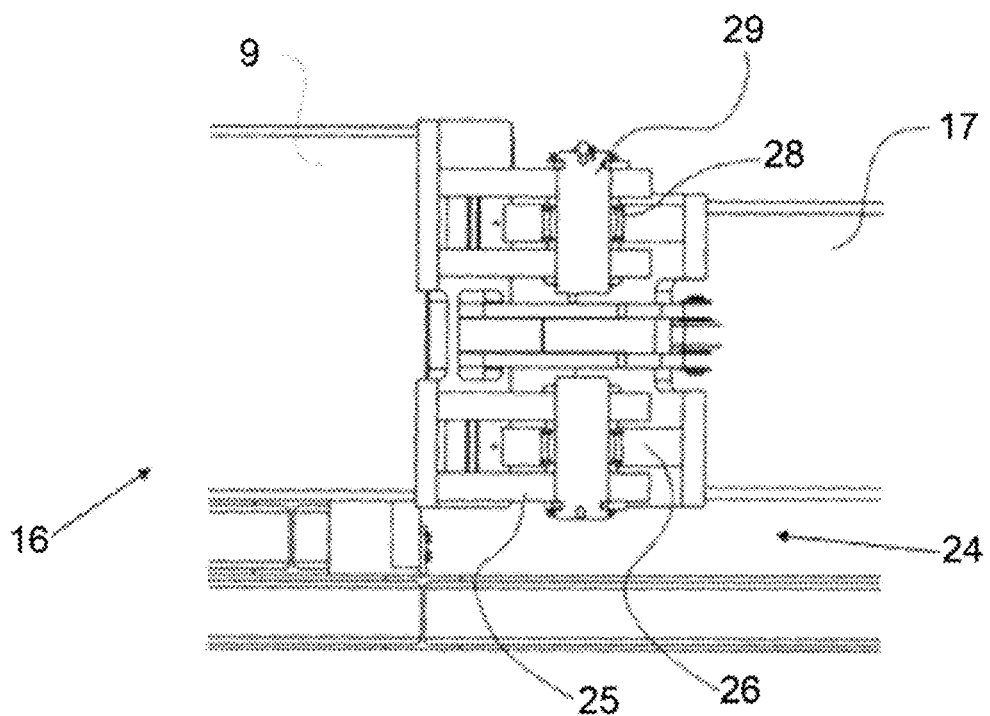

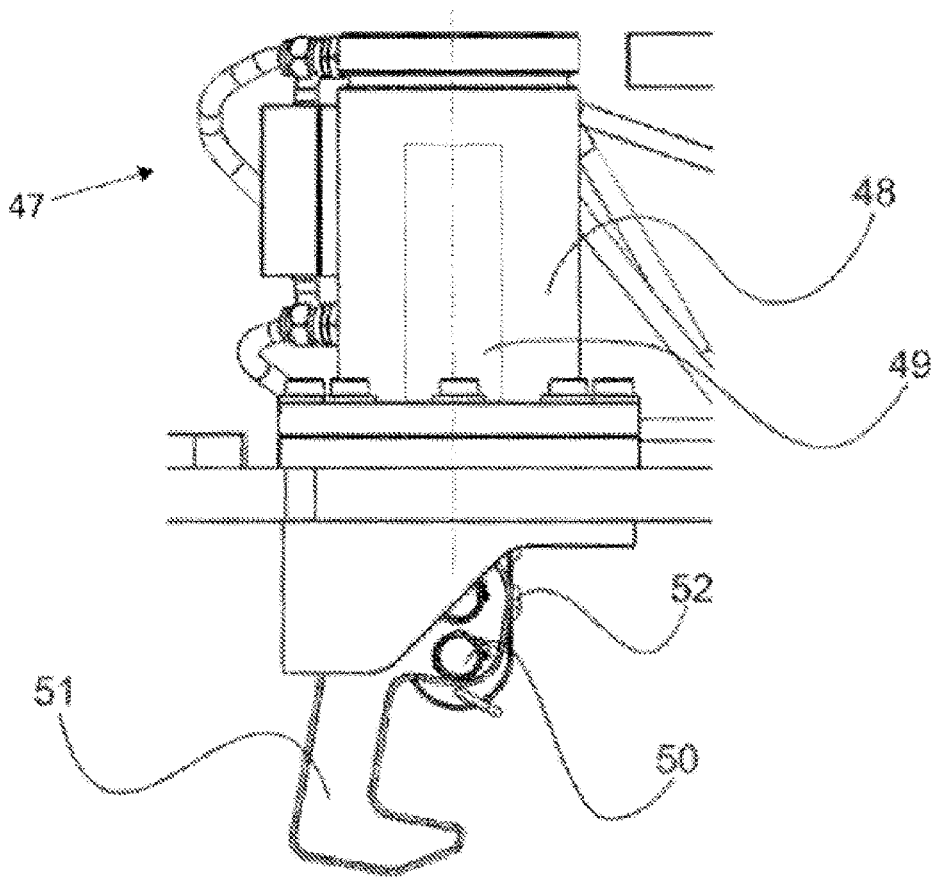

SYSTEM AND METHOD FOR CHANGING LINERS, THE CONFIGURATION OF WHICH ALLOWS THE AUTOMATED REMOVAL AND INSERTION OF LINERS OF A MILL USED FOR ORE GRINDING

FIELD OF THE INVENTION

The present invention is comprised among equipment associated with mills for ore grinding in the mining industry; the application particularly relates to the replacement of wear elements, such as the liners or shields of a mill.

The invention relates to a system for changing liners or shields in a mill for ore grinding which comprises one or more robotic manipulators to perform the task of removing and reinstalling liners during the changing process.

BACKGROUND OF THE INVENTION

Grinding is a process which allows reducing the size of the ore used in processes of a mining site concentrating plant, in which one of the types of equipment used in grinding is the so-called semi-autogenous grinding mill or SAG mill, the inner surface of which is lined with liners or shields of a different type and shape, according to their location on the inner surface of the mill.

Liners are subjected to constant wear due to the impact of ore and grinding means (steel balls) thereon, so they must be changed periodically.

Liners are usually changed using remotely controlled manipulation equipment which requires operators to be inside the mill to help in positioning and guiding the liners, with this being a high-risk process for the staff intervening in the changing operation, as well as incurring a great deal of time associated with the maintenance operation.

The method for changing liners in the mill requires the mill to be rotated several times, which entails a lockout-tagout method for motors moving the mill, reducing effective working times, despite the liner manipulator being arranged inside the mill at all times during this operation.

To change liners inside the mill, there is furthermore a need to perform a series of preparatory works including among them:

Coordinating with operating staff (halting the mill).
Coordinating access area cleaning and set up.
Coordinating an overhead crane to move smaller equipment.
Providing auxiliary support elements, safety rope, ladders, etc., in the area.
Determining the liners to be changed.
Stocking new liners.
Logistics for supplying new liners and removing used liners.

The process of changing inner liners of mills requires carrying out a series of operations such as:

Preparation and setting up the area which involves halting the mill, moving the tools and equipment to be used to the area (tools for knocking out bolts, tool for cutting nuts, tool for applying torque on bolts, etc).
Access to the inlet opening of the mill where the "feeding chute" and smaller elements are removed, which involves clearing the area to access the inside of the mill, to then move these elements to an area set up for temporary storage.
Installation of a liner manipulator which requires the coordination of a number of staff members and a rigorous operation to introduce the manipulator into the mill (through the span of the equipment and small access space).
Knocking out bolts, an operation that must be performed from outside the mill by staff and equipment for cutting nuts and knocking out bolts, where these bolts generally fall into the mill.
Disassembly of worn liners: Once the bolts have fallen into the mill, worn liners are pushed using equipment for knocking out bolts, and they fall into the mill. If needed, "torching" by means of oxy-fuel cutting (thermal cutting) of the fused joints between liners (liners stuck together as a result of "internal forging" and high impact pressures) must be performed additionally and prior to disassembly.
Removal of used liners, performed by means of a liner manipulator mounted at the end of an extended beam, allowing the liners that fell into the mill to be loaded and deposited one-by-one in a movable carriage which takes said liners out of the mill.
Installation of new liners, in which different types of liners are supplied from outside the mill on the movable carriage of the extended beam; this operation is performed according to the defined maintenance strategy in which the maintenance staff utilize the bolt projections going through the mantle to provide the initial fixing tightness to the liner.
Rotations of the mill, which allow setting up different inner regions to repeat the new liner extraction and installation process.
Re-installation of the feeding chute, in which once the new liners are located inside the mill, the liner manipulator is removed, and the feeding chute is installed again.
Application of torque on bolts, in which the new liners are usually installed directly with their clamping bolts, with a part of the bolt projecting outwardly from the mantle; this bolt projection is used to secure the liner with a nut/cup washer on the outside of the mantle. This nut is tightened under a controlled torque, which secures the fixing of the liner over time, at least until the subsequent halting for maintenance.

The methods and equipment used in the art for the liner changing process have a series of drawbacks and problems impacting production, as well as the occupational health and safety of the staff.

With the equipment and methods used today, the liner changing time lasts for several days where it is estimated that, on average, the changing of liners is performed at a speed of 5 to 6 liners per hour, which reduces mill availability. The entire production of the plant is halted while maintenance lasts.

The main activities influencing the enormous amounts of time lost in performing the maintenance task of changing liners are related to the loosening and knocking out of liner clamping bolts, the actual extraction of the liners, and the installation of new liners. The low speed of conventional equipment used today in the art that is in the order of 1 to 2 rpm prevent said equipment from being more efficient in the time used for performing the maintenance task.

Moreover, in practical terms, as regards maintenance, a weak fixing of liners in the bolts will cause the loosening thereof, favoring pulp leakages, and therefore contamination leaking from the mill to the outside, and it will also cause liners to fall, and therefore unscheduled halting and production loss.

The current method generally involves the staff going into the mill, which is intrinsically risky, working at height, and being exposed to the possibility of the ore or manual tools falling from the mill itself, among others.

The maintenance staff must intervene in the handling of the liners in order to change said liners, which is very physically demanding and involves the risks of getting hit or trapped while removing and inserting liners.

The conventional liner manipulator used today in the art manipulates and controls liners by way of remote control. Additionally, operation with the current machine requires constant interaction and collaboration among the maintenance staff for grabbing, guiding, and releasing the liner. Moreover, the visibility of the operator of the conventional machine and of the maintenance staff is very low inside the mill, which may lead to a lack of coordination. All these activities involve a high risk, since the machine may hit against operators or operators may be hit by liners, situations that may be fatal should they occur.

National application 199800559 (COELHO) with a publication date of 12 Mar. 1999 describes a machine for simultaneously changing the inner liner of the covers and the mantle of the cylinder of a SAG mill, consisting of two arms or a dual manipulator forming a mobile structure which is inserted into the mill. However, it makes no reference to equipment which allows performing the tasks for the automated removal and insertion of liners from/into the mill with the appropriate instruments and control.

Moreover, national application 2642-2005 (MI ROBOTIC SOLUTIONS S.A.) with a publication date of 1 Jun. 2007 and corresponding to National Registration 49044 describes a robot-assisted method for the process of removing bolts from SAG mills, which method in turn comprises providing a robotic arm with at least 5 degrees of freedom, grabbing a nut cutting tool from a tool carrier rack, cutting or loosening the nut, and grabbing a tool for removing bolts to knock a securing bolt out of the mill.

There is a need in the art to provide a system, equipment, apparatus, and/or device for manipulating liners and/or shields inside a mill, the configuration of which allows preventing the staff from having to perform strenuous activities under constant exposure to different process risks, improving the performance of the operation involving the use of the methods and equipment used in the art, such that the operation can be carried out in an automatic manner with optimal trajectories, greater precision, and increased safety.

BRIEF DESCRIPTION OF THE INVENTION

The object of the present invention relates to providing a system and method for changing liners of a mill, the configuration of which allows the automated robotic manipulation of liners of mills for ore grinding in comminution processes, the configuration and operation of the system allows the task of manipulation to be improved by having a greater degree of freedom and/or flexibility in its movements, providing a greater degree of certainty and efficiency to the method, thus optimising the time that the mill is halted for maintenance, and also preventing the risks to which maintenance staff may be exposed.

The invention consists of a system for changing liners (1), the configuration of which allows the automated removal and installation of liners of a mill, used for reducing the size of the ore, comprising at least one support structure (2), at least one system (3) for supplying and moving liners, at least one robotic manipulator system (4) for manipulating the liners, at least one liner manipulation tool (5), at least one artificial vision system (6), and at least one control system (7).

The invention further comprises a method for changing liners of a mill, comprising the steps of putting the system in place with the telescopic beam inside the mill, and therefore the robotic manipulators as well, inserting the liners to be changed into the mill so as to place them in the proximity of the robotic manipulator, detecting the liner in the movable carriage inside the mill, identifying the position and type of liner by means of an artificial viewing system to automatically determine where the liner should be held for its insertion, scanning the mantle of the inner surface of the mill by means of using cameras capable of acquiring spatial information of the surroundings to identify the location where the liner must be inserted, the robotic manipulator inserting the liner in the determined location based on the trajectories that it generates upon receiving the spatial coordinates, and performing the preceding steps in the reverse order to extract a liner from the inner mantle of the mill.

The configuration of the system and the operation of the method for changing liners of a mill of the present invention allows said changing of liners to be performed with high precision, the method being carried out in a completely automatic manner in which the artificial vision system indicates the insertion point, which thereby allows reducing the time of the current manual process, furthermore ensuring the correct insertion of each liner, providing a greater degree of certainty and efficiency to the method, thus optimising the time the mill is stopped for maintenance. Additionally, since it is an automated system, it allows removing staff from inside the mill, which is a critical aspect from the safety viewpoint.

DESCRIPTION OF THE DRAWINGS

In order to help to better understand the features of the invention according to a preferred practical embodiment thereof, a set of drawings is attached as an integral part of the description in which the invention is depicted in an illustrative and non-limiting manner.

FIG. 2 corresponds to a perspective view showing part of the support structure of the system of the invention located adjacent to the mill.

FIG. 5 corresponds to a top plan view of the pivoting attachment between the telescopic beam and the pivoting beam of the system of the invention.

FIG. 6 corresponds to a side view in a longitudinal section showing in detail the pivoting attachment between the telescopic beam and the pivoting beam of the system of the present invention.

FIG. 11 corresponds to a side view showing in detail the gripping system comprising the tool for grabbing a liner comprised in the system of the invention.

PREFERRED EMBODIMENT OF THE INVENTION

Figure 1:
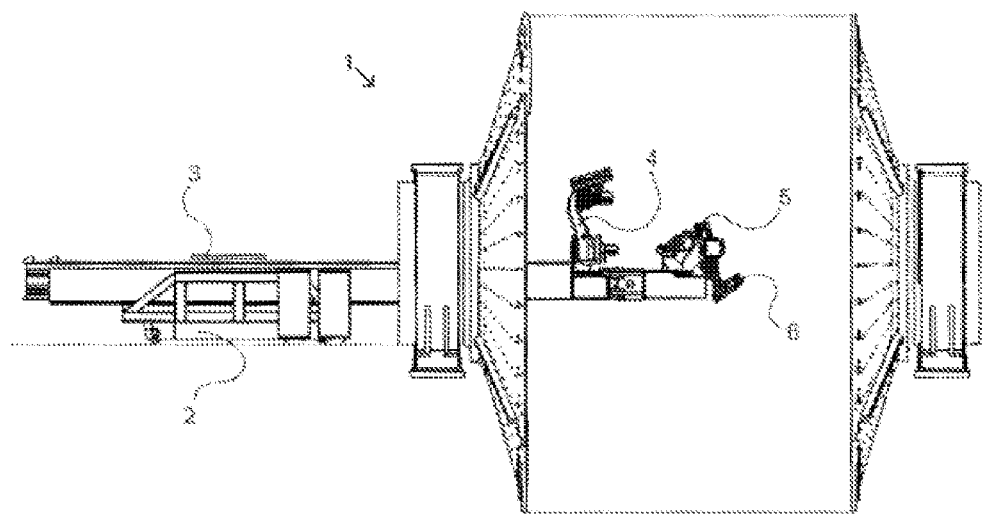
FIG. 1 corresponds to a side view of a longitudinal section showing the system for changing liners in a mill of the present invention.
Figure 1A:
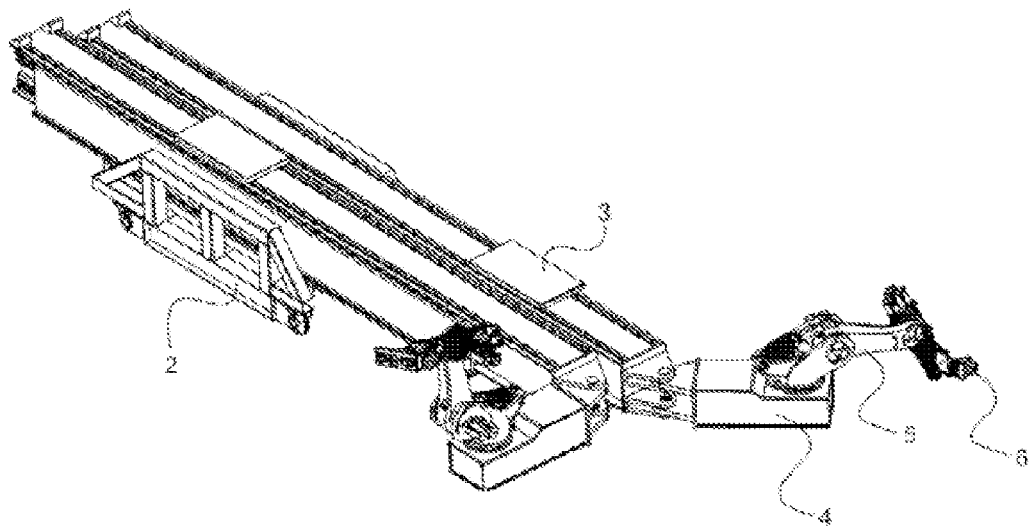
FIG. 1a corresponds to a top perspective view of the system for changing a liner of the present invention.

The invention consists of a system and method for changing liners (1), the configuration of which allows the automated removal and installation of liners of a mill used for grinding ore, as schematically illustrated in FIGS. 1 and 1a, comprising at least one support structure (2), at least one system (3) for supplying and moving liners, at least one robotic manipulator system (4) for manipulating the liners, at least one liner manipulation tool (5), at least one artificial vision system (6), and at least one control system (7).

Figure 3:
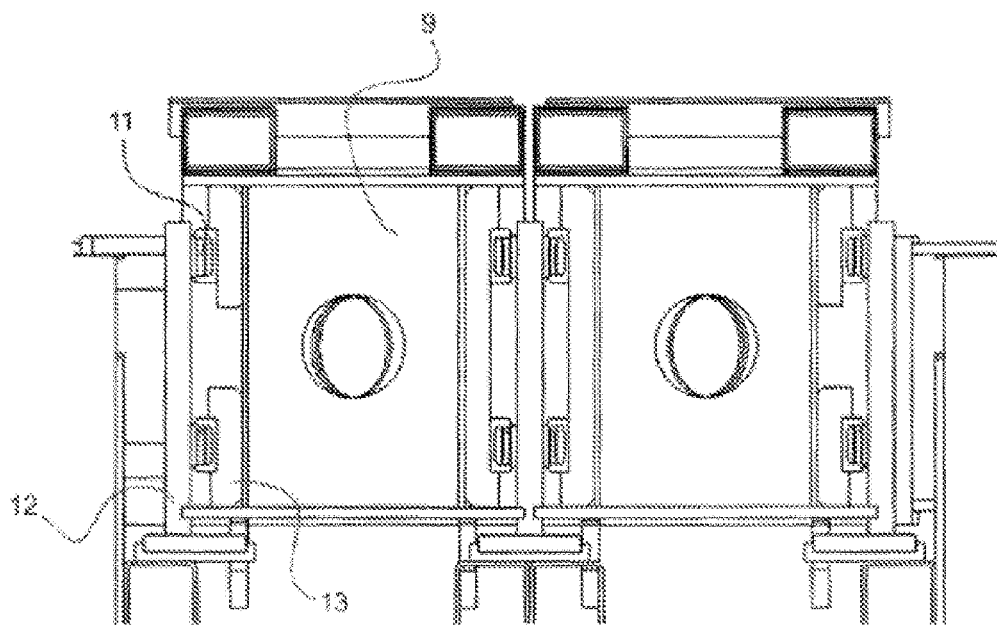
FIG. 3 corresponds to a cross-section view through the telescopic beams comprised in the support structure of the system of the invention according to lines A-A of FIG. 2.
Figure 3A:
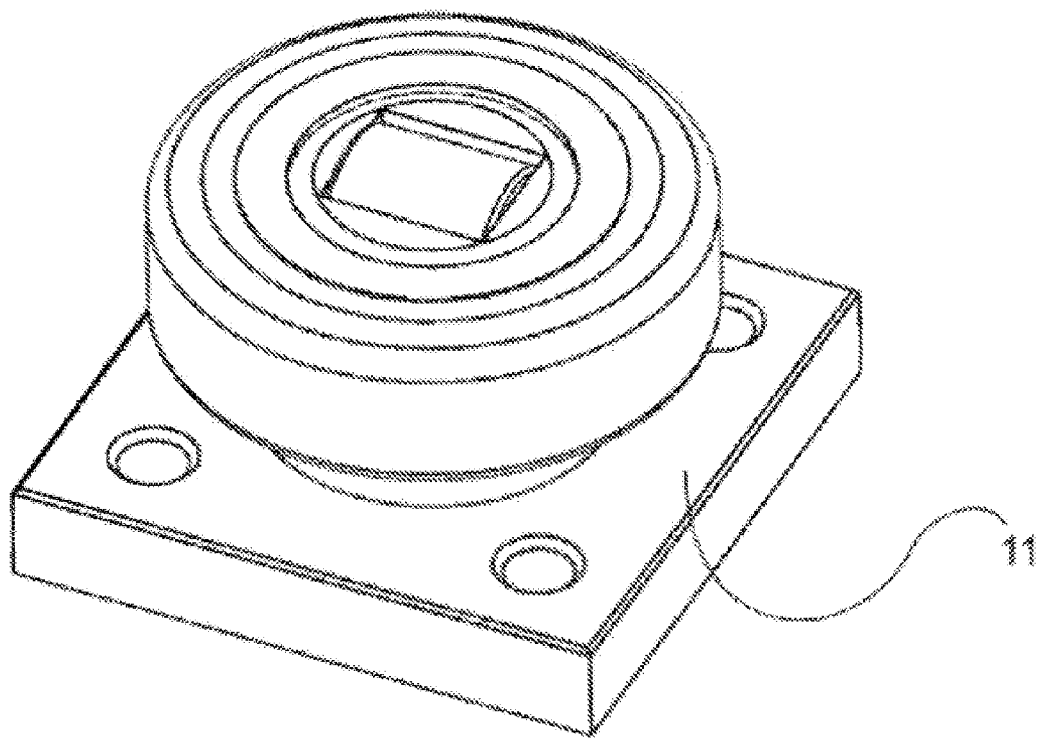
FIG. 3A corresponds to an enlarged view of section A of FIG. 3.

The support structure (2), illustrated by way of example through FIG. 2, comprises at least one support body or base (8), which allows holding, supporting, and positioning the system for changing liners in a location adjacent to the entrance of the mill where liners from the inner surface of the mill will be changed, wherein said support base or body (8) is arranged outside a mill in which there is supported at least one telescopic beam (9) comprising movement means (10) configured by a series of bearings (11) which are arranged along a rail beam (12) fixed to the support base or body (8), and wherein said telescopic beam (9) comprises along a position of its side faces rails (13) which are coupled with said bearings (11) in a manner that allows the telescopic beam to move axially into the mill (FIGS. 2, 3, 3a). The upper face of the telescopic beam (9) comprises the system (3) for supplying and moving liners which is configured by rails (14) through which a movable carriage (15) comprising bearings (11) moves, such that liners are deposited by means of conveyance equipment, as can be seen in FIGS. 2 and 4, on said movable carriage (15) which are actuated to move the liner along a path over the telescopic beam (9) to an end (16) which is attached to a pivoting beam (17) to arrange the liners adjacent to the robotic manipulation system (4).

Figure 5A:
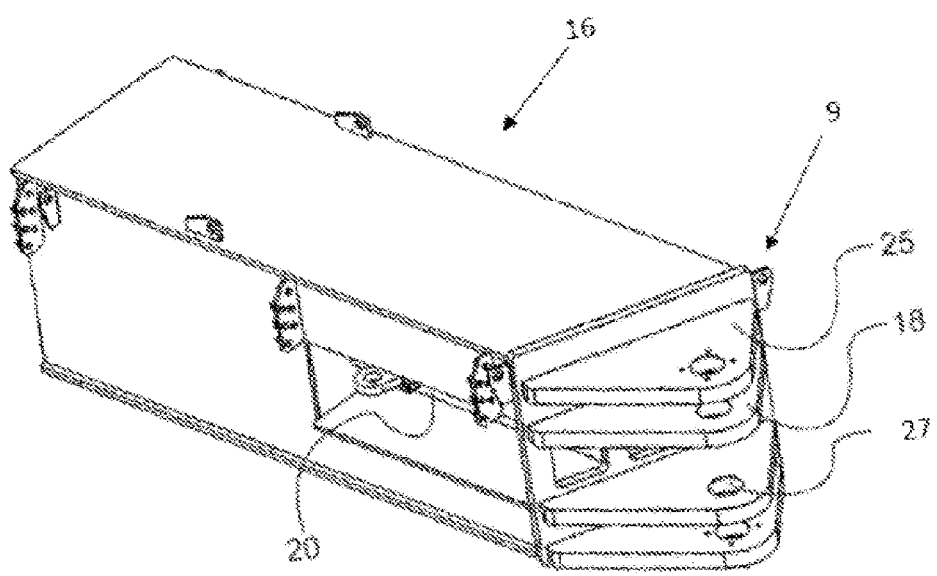
FIG. 5a corresponds to a perspective view showing in detail the end of a telescopic beam of the system of the present invention.
Figure 5B:
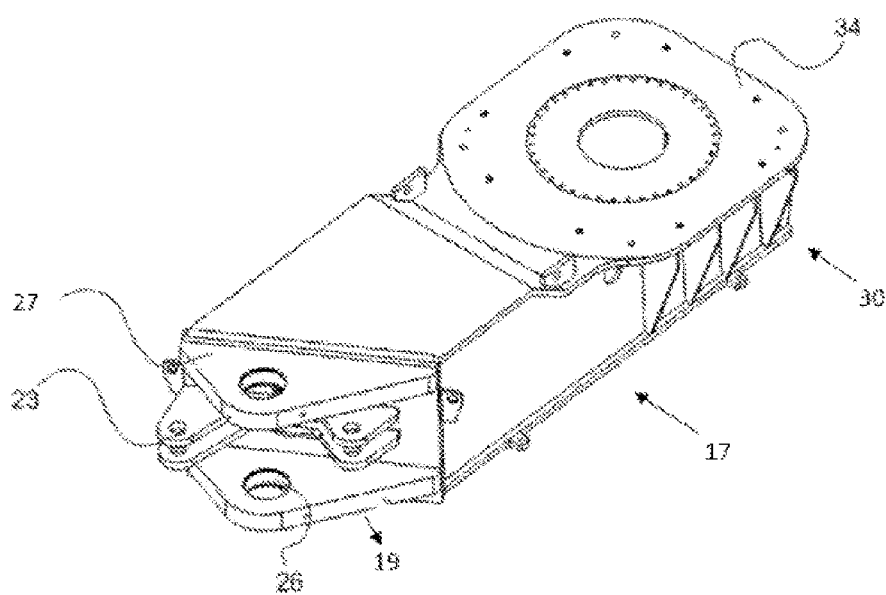
FIG. 5b corresponds to a perspective view showing in detail the end of a pivoting beam of the system of the present invention.
Figure 5C:
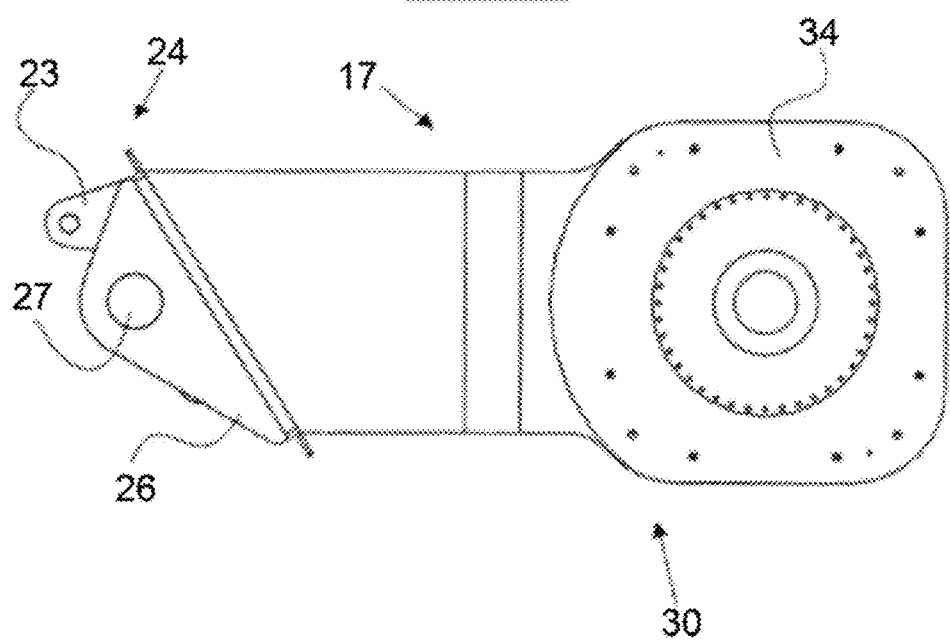
FIG. 5c corresponds to a top view showing in detail the telescopic beam of the system of the present invention.

The telescopic beam (9) illustrated by way of example through FIGS. 2, 5, and 5a, comprises at end (16) a pivoting attachment (18) for being attached to a pivoting attachment (19) of the pivoting beam (17), which can be seen in FIG. 5b, forming a tongue-and-groove-type pivoting attachment assembly (FIG. 6). The telescopic beam (9) further comprises at said end (16) at least one housing (20) for at least one actuator (21), which is fixed at one of its ends to a cylinder support (22) arranged in the housing (20) and is fixed at its opposite end to a cylinder connection assembly (23) comprised in the pivoting beam (17), wherein it comprises, at each of the ends of the cylinder both at the attachment point of the fixed arm (31) and the extendable arm (32) of the cylinder, an attachment system formed by a ball bearing (28), such that said ends (31) and (32) are attached to the cylinder support (22) and to the cylinder connection assembly (23) through pins (33) to thereby form a drive for driving the movement of the pivoting or rotating attachment (FIGS. 5a, 5b, 5d, 6, 7, 8).

As can be seen through FIG. 6, the pivoting attachment assembly which is configured between the attachment of the end (16) of the telescopic beam (9) and the end (24) of the pivoting beam (17) comprises a tongue-and-groove attachment system, formed by at least one tongue attachment (25) and at least one groove attachment (26), which are interchangeably configured at least at one of the ends (16) of the telescopic beam and/or of the end (14) of the pivoting beam (17). Said tongue attachment (25) and groove attachment (26) comprise through holes (27), wherein at least one of said through holes (27) comprises at least one ball bearing (28), such that when coupling said attachments to one another, the through holes are aligned with one another with there being arranged therein a pivoting pin (29) which, along with the ball bearing (28), form at least one pivoting or rotating attachment between the telescopic beam (9) and the pivoting beam (17).

Figure 4:
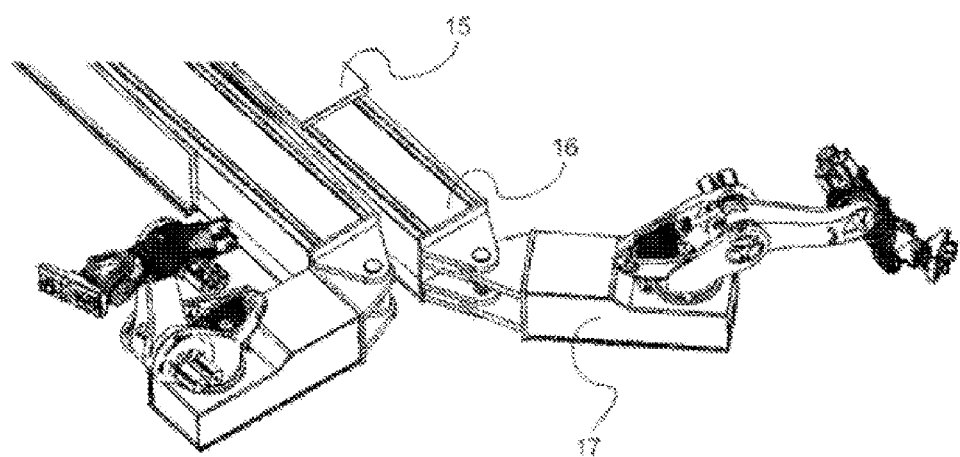
FIG. 4 corresponds to a top perspective view showing the robotic manipulation system of the system of the invention inside the mill.
Figure 4A:
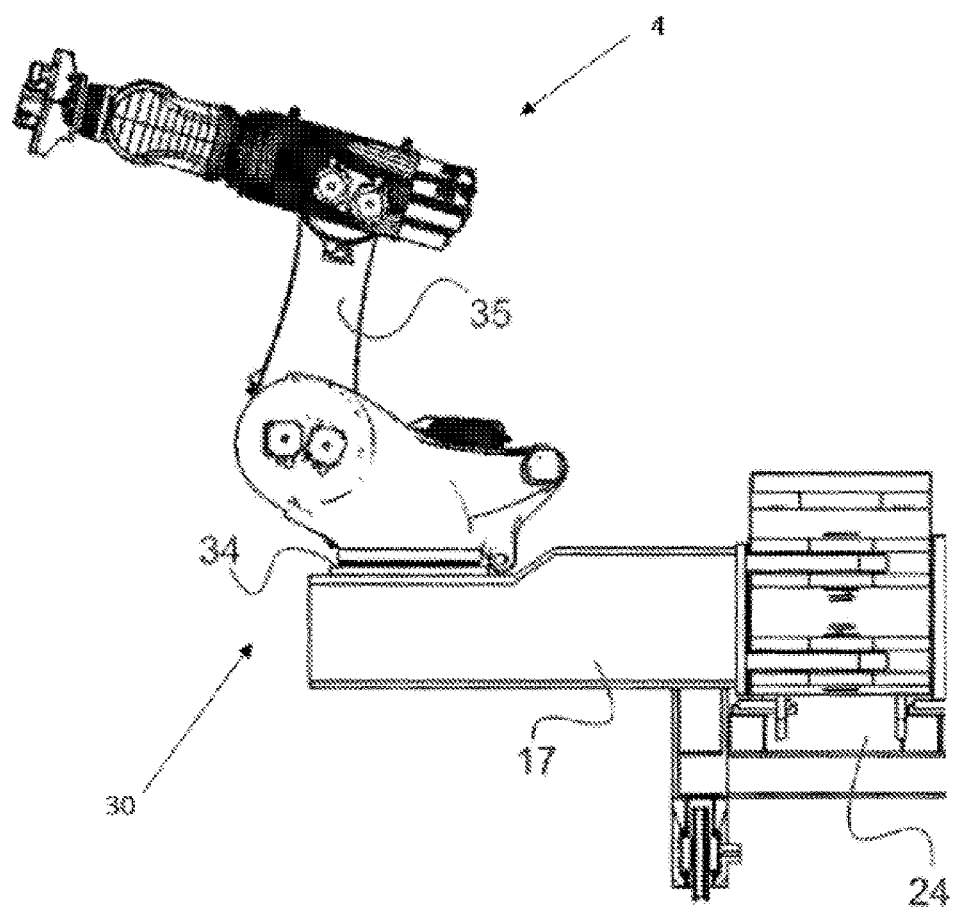
FIG. 4a corresponds to a side view showing the robotic manipulator of the system of the present invention.
Figure 4B:
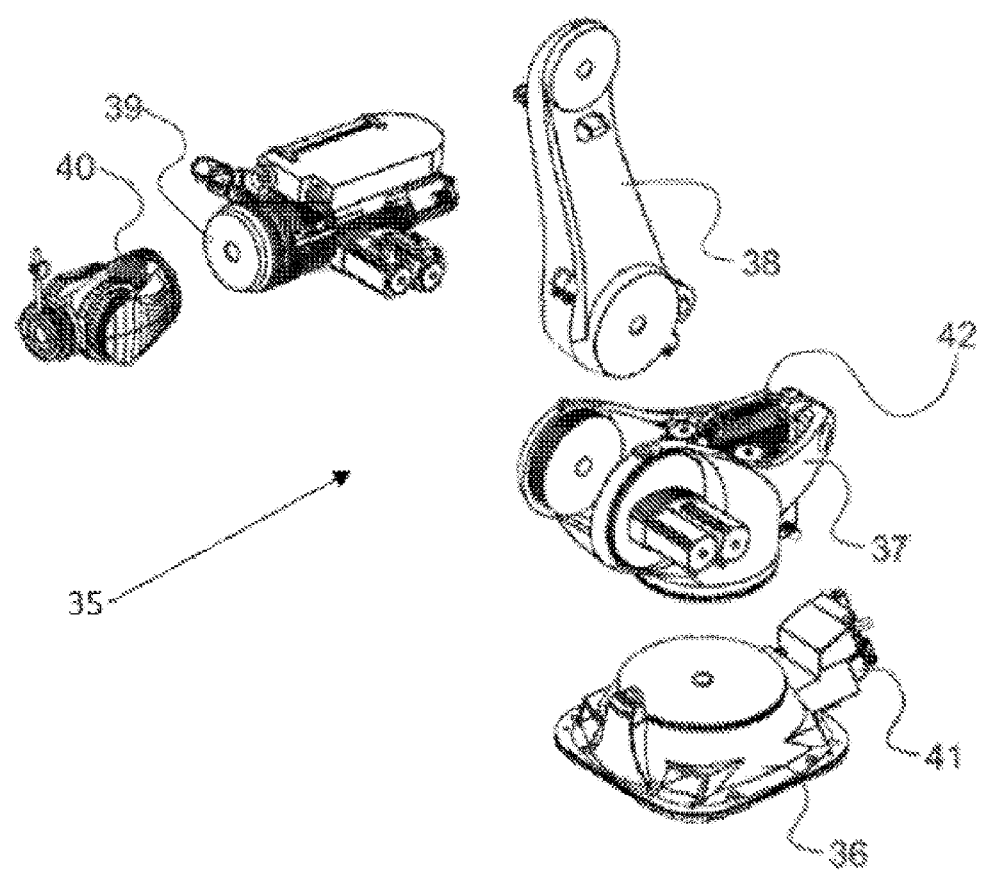
FIG. 4b corresponds to an exploded view of the robotic manipulator of the system of the present invention.

The pivoting beam (17) (see FIGS. 5b, 5c) comprises a second end (30) comprising a mounting surface (34) for fixing at least one robotic manipulator system (4) for manipulating the liners, wherein the robotic manipulator system (4) which, in a preferred embodiment, is illustrated by way of example in FIGS. 4 to 4b, comprises a robotic manipulator (35) formed by a base (36) which is fixed to the mounting surface (34), wherein there is mounted on said base (36) a rotating column (37), an oscillating arm (38), an arm (39), and a wrist (40) on which there is mounted at least one liner manipulation tool (5). The robotic manipulator comprises an electrical installation system (41) and a weight compensating element (42), such that said robotic manipulator is formed by at least 6 axes or degrees of freedom. The robotic manipulator system (4) has incorporated therein a liner position detection means configured by at least one artificial vision system (6) which is based on artificial vision techniques by means of using laser triangulation cameras, through which the mantle of the inner surface of the mill is scanned to determine the position in which the liner must be inserted, said artificial vision system being capable of delivering the distance and angle of the succession of holes, so that the robotic manipulator (35) makes the decision for insertion and moving closer.

Figure 10:
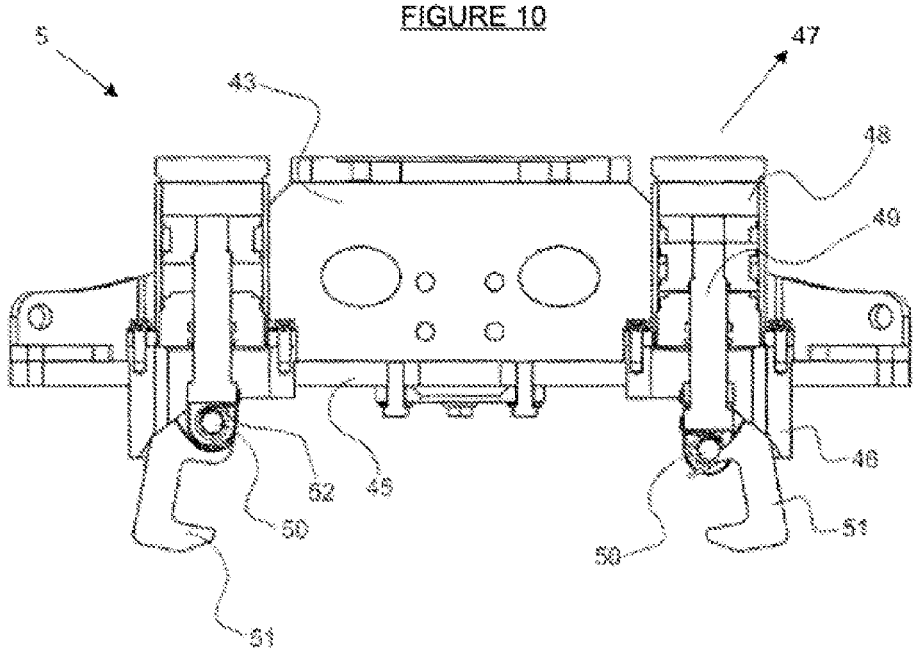
FIG. 10 corresponds to a side longitudinal section view of a tool for grabbing a liner comprised in the system of the invention.
Figure 10A:
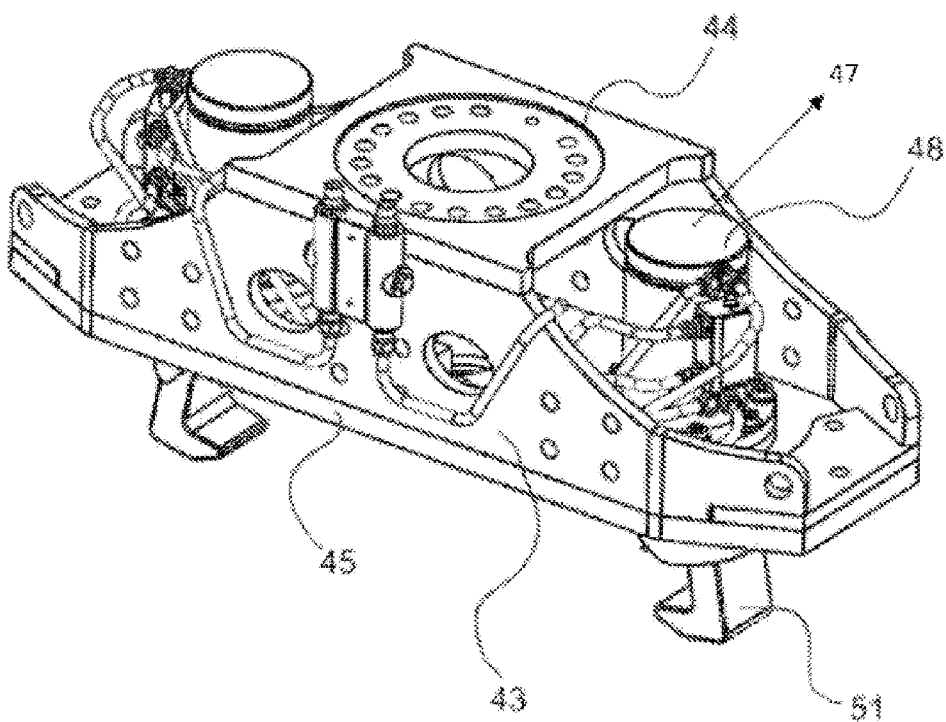
FIG. 10a corresponds to a top perspective view of the tool for grabbing a liner comprised in the system of the invention.
Figure 10B:
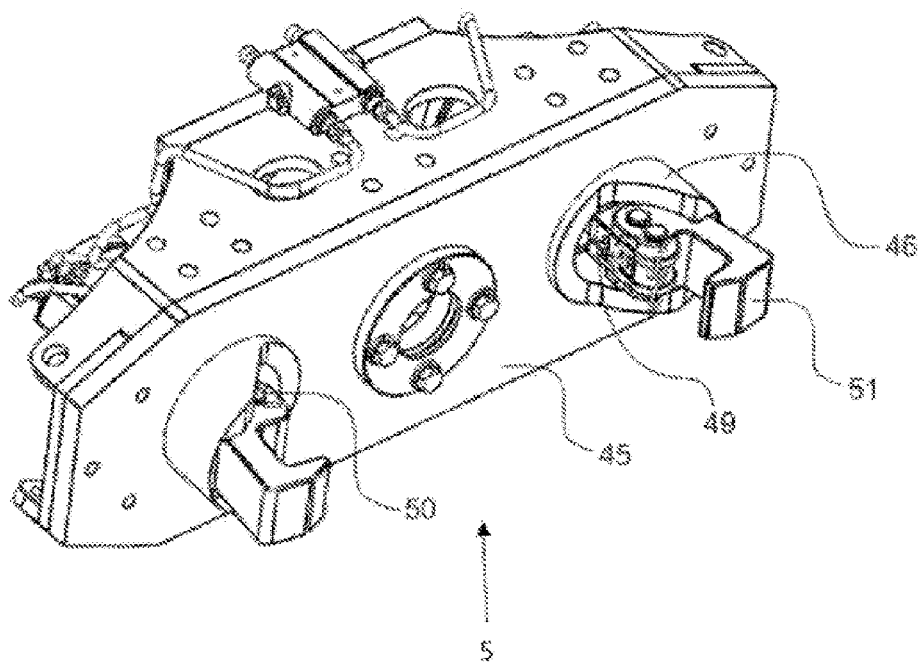
FIG. 10b corresponds to a bottom perspective view of the tool for grabbing a liner comprised in the system of the invention.

A liner manipulation tool (5), as illustrated through FIGS. 10 to 10b, is fixed to the wrist (40) of the robotic manipulator (35), wherein said tool (5) comprises a gripping structure (43) including a support plate (44) having attachment means for being able to fix the tool (5) to the wrist of the robotic manipulator (35), wherein said gripping structure further comprises a base plate (45) comprising guides (46) for the gripping means (47) which are arranged in the gripping structure (43) for the fixing and actuation thereof so as to grip the liners to be changed. The gripping means (47), as illustrated in FIG. 11, comprises a cylinder (48) which is fixed through the sliding arm (49) in a pivoting manner by means of a pivoting pin (50) to an attachment end of a grip (51), wherein said pivoting attachment further comprises a torsion spring (52). With this configuration, when the cylinder (48) is actuated, the sliding arm (49) is slid, such that the grip (51) moves through the guide (46) of the gripping structure (43) until the grip comes out from said guide, wherein it causes, wherein the actuation of the torsion spring (52) causes the rotation of the grip, through the pivoting attachment, and the opening thereof to enable arranging the grip adjacent to the attachment means of the liner. Then, the cylinder is again actuated in the reverse order, whereby the grip moves up through the grip guide (46) of the gripping structure, causing the movement and closure of the grip, engaging the gripping means of the liner, fixing and thereby holding the liner to securely move it to the point where it will be arranged by the robotic manipulator (35).

The rotating column (37), which is the base of the robotic manipulator (35), allows the entire robotic manipulator to rotate in different positions so as to allow the liners fixed in different positions to reach the inner shell of the mill, and the first and second oscillating arms (38, 39) allow the liner manipulation tool (5) to be moved to the different working points of the mill. The wrist (40) allows the liner manipulation tool (5) to be rotated and/or turned, orienting same depending on the liner grabbing point, wherein the gripping means (47) of the tool furthermore pivot and ensure the grabbing and the position of the liner.

Figure 5D:
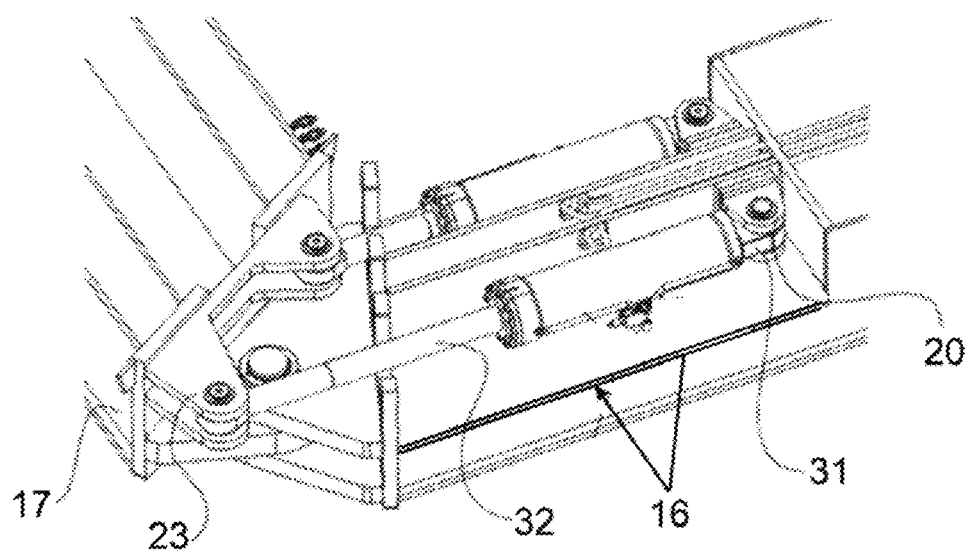
FIG. 5d corresponds to a top view showing part of the pivoting attachment system between the telescopic beam and the pivoting beam of the system of the present invention.
Figure 7:
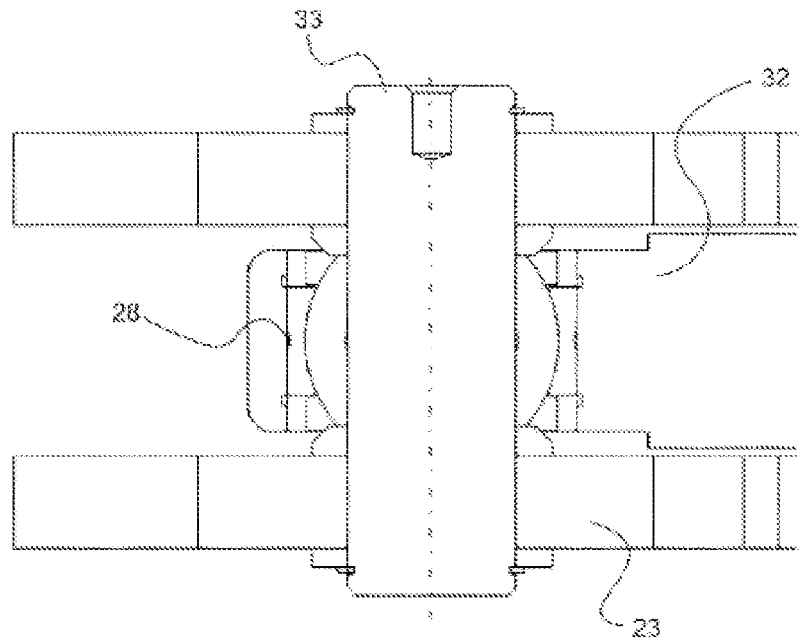
FIG. 7 corresponds to a sectional side view showing in detail the pivoting attachment of a cylindrical actuator which is part of the pivoting attachment between the telescopic beam and the pivoting beam of the system of the present invention.
Figure 8:
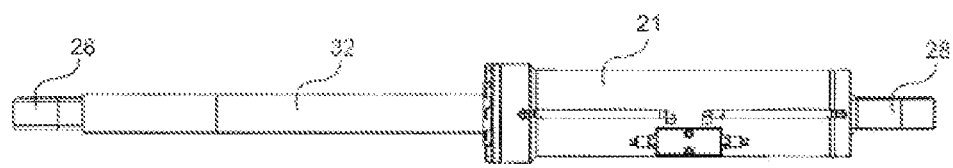
FIG. 8 corresponds to a view of a cylindrical actuator used in the system of the present invention.
Figure 9:
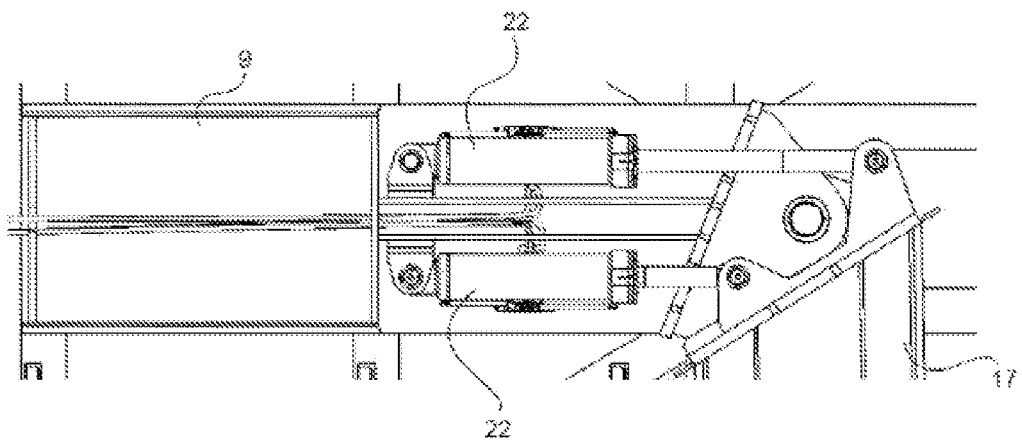
FIG. 9 corresponds to a top view schematically showing the movement between the telescopic beam and the pivoting beam of the system of the present invention.

As can be seen from the illustration of FIG. 9, the pivoting attachment system between the telescopic beam (9) and the pivoting beam (17) allows providing an additional axis of rotation to the system for changing liners (1) which, when in operation, allows the movement of the pivoting beam (17) with respect to the telescopic beam (19) at an angle of about 180° degrees, by means of the actuation of at least one of the cylinders (22) which, through the movement of the arm, moves the pivoting beam (17), rotating it as a result of the pivoting attachment configured in the cylinder connection (23) and the pivoting attachment assembly, as can be seen in FIG. 5D, therefore according to the degree of actuation of the respective cylinder, a rotation of the pivoting beam (17) at a specific angle with respect to the telescopic beam (9) is achieved.

The artificial vision system (6) preferably comprises a laser triangulation camera, the acquisition system of which is based on laser triangulation, acquiring spatial information of its surroundings, wherein said acquired information is processed through a computer, further comprising a PLC integrating at least one camera and the computer thereof with the control system for controlling the positioning of the pivoting beam (17) and the robotic manipulator (25) to achieve the specific position captured by the cameras, wherein angular orientation and position data passes through the PLC for transmission to the robotic manipulator (35) and for controlling same.

In this manner, at least one robotic manipulator system (4) for manipulating the liners therefore comprises a configuration of at least 7 degrees of freedom, i.e., it has at least 7 axes or attachments that can pivot with respect to one another, allowing each of the elements to perform a movement that is different or that is in different positions or directions with respect to the other, allowing the liner manipulation tool (5) to be oriented depending on the liner grabbing point, the tool to be moved to different working points, and/or allowing the entire robotic manipulator to be rotated to different positions inside the mill to access the different positions where the changing of liners is required.

At least one pivoting beam (17) allows the robotic manipulator (35) to reach the surface of the mantle inside the mill. Moreover, the telescopic beam (9) moves axially along the mill, allowing the robotic manipulator to be introduced in and to exit the mill, and the motor allows moving, with independent motorisation, at least one movable carriage (15) on the telescopic beam, which has at least one compartment, of the platform type, in which the robotic manipulator (35) and/or a forklift or other loading system can deposit the removed liners, allowing new liners to be loaded outside the mill, i.e., the movable carriage (15) allows the liners to be moved from and into the mill. The artificial vision system (6) may comprise a stereo camera system which, by means of overlaying images, takes a 3D capture of the work area, wherein said acquired information is processed through a computer which identifies and locates the points of interest, which information is sent to the PLC for subsequent transmission to the robotic manipulator (35) for the final positioning thereof.

The control system (7) allows operating and controlling the system for changing liners (1) of the present invention, wherein said device corresponds to a group of cabinets which have the function of providing power and controlling the system, in addition to having controls for commanding and monitoring same. The cabinets comprised in the control system (7) correspond to at least one switchgear or SG, control panel or CP, manipulator control cabinets, position detection panel PDP, and human machine interface or HMI, inductive sensors, encoder, among other control means.

The switchgear SG corresponds to the cabinet containing elements for protection against surges, protections for the electrical equipment of the control cabinet, local cabinet for controlling the robotic manipulator, equipment such as the robotic manipulator itself and the HMI (human machine interface) operator panel. It also contains the single-pole bar for distributing power to the different elements and/or cabinets. It has a main single-phase thermomagnetic disconnector for opening or closing the circuit for introducing electric power, in addition to pilot light indicators.

The manipulator control cabinet mainly contains the drives necessary for actuating each servomotor of the robotic manipulators and is connected to the general CP. One or more control cabinets is required for the functionality of the apparatus.

The CP corresponds to a panel for storing components in charge performing system control, the base of this cabinet being its main controller, internal memory, and management of a digital input module.

The position detection panel PDP contains a computer connecting to and receiving signals from the artificial vision system (6) which captures the internal position of liners with high precision, with the computer processing the data and sending the signals to the CP in order to position the robotic manipulators, with liner insertion and/or removal routines of same.

The main purpose of the inductive sensor is to determine the travel limit for the telescopic beam (9) and to determine whether the grips (51) of the liner manipulation tool (5) are open or closed, and the purpose of the encoder is to determine the position of the pivoting beam (17) every time a movement of said pivoting beam occurs.

The HMI corresponds to the panel for online process monitoring and control with connection to the main controller. The terminals support data input by the operator through a display, one or two remote controls and buttons for opening and closing the line manipulation tool.

Additionally, it presents a safety architecture formed by a controller which monitors all the safety signals of the apparatus, emergency stop buttons, and excessive torques. The emergency stop buttons are mushroom-type stop buttons and are located in the operation panel and on the side of the accesses. The actuation of emergency stop buttons causes the apparatus to be halted. The re-establishment of an emergency stop button alone does not leave the apparatus in conditions to start operating again; inspection of the emergency stop button by the operator is required at all times. The reinstatement of the emergency stop buttons is performed in the region where the latter was inactivated, but inspection of the emergency stop buttons is performed through the operating display.

Figure 12:
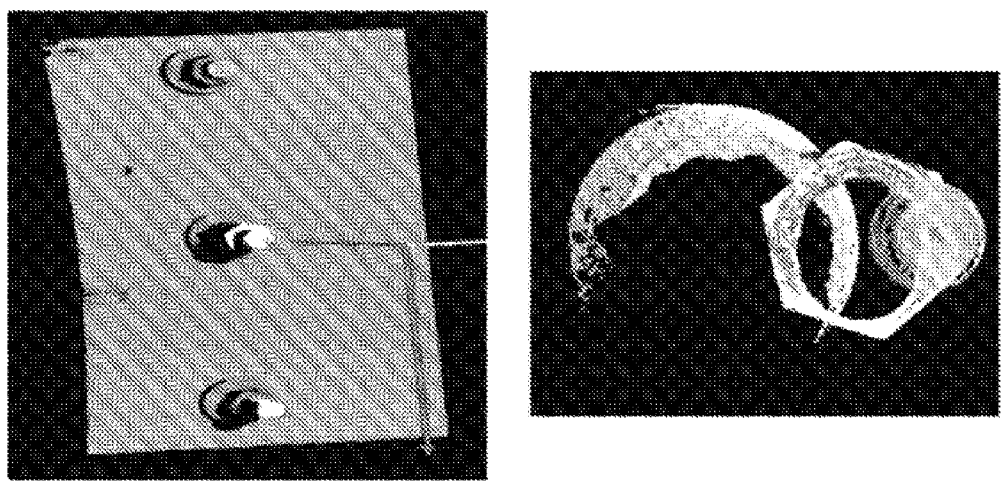
FIG. 12 corresponds to an image representing the coordinates and data taken in the step of scanning the mantle of the mill of the method of the present invention.

The method for changing liners comprises putting the systems (1) in place, with the telescopic beam (9) inside the mill, and therefore the robotic manipulators (35) as well, to then supply the liners through the system for supplying liners, constantly positioning the liners on the movable carriage that is being moved into the mill, position it in the proximity of the robotic manipulator (35) such that it can be grabbed without difficulty. The movement of the movable carriage is controlled by a motor-driven system equipped with sensors, allowing this step to be completely automatic from the entrance of the mill. Then, the step of detecting the liner in the movable carriage is carried out by the robotic manipulator (35) when the movable carriage is positioned at the end-of-travel position or the movement rail comprised in the telescopic beam (9) by means of the artificial viewing system (6) automatically identifying the specific liner type and the position where the liner should be held for its insertion. By using cameras capable of acquiring spatial information of the surroundings, by way of example by means of structured light or laser triangulation, the mantle of the inner surface of the mill is scanned, making it possible through this step to identify with high precision the location where the liner must be inserted, indicated to the robotic manipulator the spatial and angular coordinates of the points required for inserting the liner which is illustrated by way of example through FIG. 12. After processing the image using 3D segmentation algorithms, the location of the new liner where the insertion of the liner is performed by means of the robotic manipulator (35) based on the trajectories that it generates upon receiving the spatial coordinates is determined, said liner insertion step being completely automatic in which the artificial vision system indicates the insertion point, which thereby allows reducing the process time by 10% compared to the current manual process, furthermore assuring the correct insertion of each liner.

Once the insertion of the liner has ended, the telescopic beam is automatically moved from the working region of the robotic manipulator (35) to access the rest of the inner area of the mill, repeating the operation until the entire area of interest or the changing of the liner is completed.

The liner removal process contemplates the same steps of the process described above, but it is carried out in the reverse order; considering that the main objective is to extract the liner, the process starts with the detection of the liner in the space, where the liner can be grabbed directly from the position in the mantle or from the surface of the inner material of the mill, subsequently removing it from its position and safely leaving it on the movable carriage for extraction thereof from the mill.

By means of the configuration of the present invention, the apparatus can be operated in an automated manner from outside the mill, thereby preventing the staff from having to be present in the mill to perform the liner manipulation operation, and providing the robotic manipulator with the configuration needed to improve the manipulation operation by having a greater degree of freedom and/or flexibility in its movements, providing the method with a higher degree of certainty and efficiency with respect to the equipment used in the art.

Although the configuration of the system for changing liners of a mill used for ore grinding herein described constitutes a preferred inclusion of this invention, it must be understood that the invention is not limited to this specific form of the system for changing the liner, given that changes can be made therein without departing from the scope of the invention defined in the attached claims.

The invention claimed is:

1. A robotic system for automatedly changing liners in a mill used for ore grinding comprising:
    a tool including a gripper for manipulating objects in the mill,
    said tool configured for removing and installing the liners;
    a robotic manipulator for manipulating said tool and including a rotatable column and including at least one arm and a wrist,
    said tool attached to said robotic manipulator;
    a support structure attached to said robotic manipulator and for supporting at least the liners;
    a pivoting telescopic beam attached to said robotic manipulator;
    a supply structure for supplying said tool with at least the one liner;
    an artificial vision system for locating the objects,
    said vision system in communication with said robotic manipulator;
    and
    a computer-based control system for controlling the operation of said robotic manipulator including the changing of the liners;
    wherein said artificial vision system comprises laser triangulation cameras controllable by said control system and scans an inner surface of the mill so as to determine distance and angle of holes,
    thereby causing said robotic manipulator system to self-adjust position accordingly.

2. The system of claim 1,
    wherein said pivoting telescopic beam comprises extendable rails which are extendable for entering into the mill.

3. The system of claim 1, further comprising a pivoting attachment for attaching at an end of said telescopic beam, said attachment driven by said control system.

4. The system of claim 3, wherein said pivoting attachment is configured as a tongue-in-groove assembly.

5. The system of claim 3, wherein said pivoting attachment is used for mounting said robotic manipulator system.

6. The system of claim 1, wherein said artificial vision system is incorporated in said robotic manipulator system and said artificial vision system is configured to detect positions of objects.

7. The system of claim 6,
wherein said artificial vision system further includes the ability to take 3D images of a work area,
send said images to said control system, and
said robotic manipulator system receives data from said control system for positioning,
said data based on said 3D images.

8. The system of claim 1, wherein said gripper is automatedly controllable by said control system.

9. The system of claim 1, wherein said control system includes a human-machine interface for human intervention.

10. The system of claim 1,
wherein said telescopic beam is configured to move axially within the mill and is configured to deposit removed liners outside said mill.

11. A robotic manipulator configured for removing and replacing liners in a mill comprising:
the liners;
a rotatable column;
a tool including a gripper for manipulating the liners, including removing and installing the liners;
a rotatable column;
at least one arm and a wrist;
a support structure for supporting at least the liners;
a pivoting telescopic beam; and
an artificial vision system for locating objects comprising laser triangulation cameras controllable by a control system,
configured to scan an inner surface of the mill so as to determine distance and angle of holes,
thereby causing said robotic manipulator system to self-adjust position accordingly;
wherein said manipulator is configured to recognize a supply structure whereby said tool is configured to obtain at least one liner and said manipulator is in communication with said control system for controlling the operation of said robotic system including the changing of the liners.

12. The robotic manipulator of claim 11,
wherein said rotatable column is controllable by said control system so as to move at least a portion of said robotic manipulator system into position to insert or remove the liner.

13. The robotic manipulator of claim 11, further including at least six degrees of freedom and a weight compensation element.

14. The robotic manipulator of claim 11, further including at least seven degrees of freedom.

15. The robotic manipulator of claim 11, further including inductive sensors for sensing travel and travel limitation of said telescopic beam.

16. The system of claim 1,
wherein said robotic manipulator further includes at least a second arm,
each of said arms is configured to oscillate and including a wrist,
each of said wrists rotatable and with a gripper to grip a mill liner.

* * * * *